US006165387A

United States Patent [19]

Gustafsson et al.

[11] Patent Number: 6,165,387

[45] Date of Patent: Dec. 26, 2000

[54] COMPOSITION FOR ELECTRIC CABLES

[75] Inventors: Bill Gustafsson, Stenungsund; Jan-Ove Boström, Ödsmål, both of Sweden

[73] Assignee: Borealis A/S, Lyngby, Denmark

[21] Appl. No.: 09/365,939

[22] Filed: Aug. 2, 1999

Related U.S. Application Data

[63] Continuation of application No. PCT/SE98/00013, Jan. 9, 1998.

[30] Foreign Application Priority Data

Feb. 4, 1997 [SE] Sweden .................................. 9700374

[51] Int. Cl.[7] ................................ H01B 1/24; A01B 7/00

[52] U.S. Cl. ............... 252/511; 174/110 R; 174/110 SR; 174/120 SC

[58] Field of Search ............................ 252/511; 524/495, 524/910; 526/321, 329; 174/98, 110 R, 110 SR, 120 SC

[56] References Cited

U.S. PATENT DOCUMENTS

| | | | |
|---|---|---|---|
| 3,646,155 | 2/1972 | Scott . | |
| 3,749,629 | 7/1973 | Andrews et al. . | |
| 4,117,195 | 9/1978 | Swarbrick et al. . | |
| 4,286,023 | 8/1981 | Ongchin . | |
| 4,297,310 | 10/1981 | Akutsu et al. . | |
| 4,351,876 | 9/1982 | Doi et al. . | |
| 4,397,981 | 8/1983 | Doi et al. . | |
| 4,413,066 | 11/1983 | Isaka et al. . | |
| 4,446,283 | 5/1984 | Doi et al. . | |
| 4,456,704 | 6/1984 | Fukumara et al. . | |
| 4,547,551 | 10/1985 | Bailey et al. . | |
| 4,576,993 | 3/1986 | Tamplin et al. . | |
| 4,795,482 | 1/1989 | Gioffre et al. . | |
| 4,812,505 | 3/1989 | Topcik | 524/377 |
| 4,970,278 | 11/1990 | Komabashiri et al. . | |
| 5,047,468 | 9/1991 | Lee et al. . | |
| 5,149,738 | 9/1992 | Lee et al. . | |
| 5,380,803 | 1/1995 | Coutant et al. . | |
| 5,382,631 | 1/1995 | Stehling et al. . | |
| 5,453,322 | 9/1995 | Keogh et al. . | |
| 5,521,264 | 5/1996 | Mehra et al. . | |
| 5,574,816 | 11/1996 | Yang et al. . | |
| 5,580,493 | 12/1996 | Chu et al. | 252/511 |
| 5,582,923 | 12/1996 | Kale et al. . | |
| 5,718,974 | 2/1998 | Kmiec . | |
| 5,719,218 | 2/1998 | Sarma . | |
| 5,731,082 | 3/1998 | Gross et al. . | |
| 5,736,258 | 4/1998 | Moy . | |
| 5,798,427 | 8/1998 | Foster et al. . | |
| 5,807,635 | 9/1998 | Cogen et al. . | |

FOREIGN PATENT DOCUMENTS

| | | |
|---|---|---|
| 0 040 992 B1 | 5/1984 | European Pat. Off. . |
| 0 041 796 B1 | 8/1984 | European Pat. Off. . |
| 0 207 627 A2 | 1/1987 | European Pat. Off. . |
| 0 207 627 A3 | 1/1987 | European Pat. Off. . |
| 0 022 376 B1 | 3/1987 | European Pat. Off. . |
| 0 214 099 A2 | 3/1987 | European Pat. Off. . |
| 0 237 294 A2 | 9/1987 | European Pat. Off. . |
| 0 318 841 A2 | 6/1989 | European Pat. Off. . |
| 0 334 993 A2 | 10/1989 | European Pat. Off. . |
| 0 348 978 A2 | 1/1990 | European Pat. Off. . |
| 0 369 436 A2 | 5/1990 | European Pat. Off. . |
| 0 193 317 B1 | 9/1990 | European Pat. Off. . |
| 0 401 540 A2 | 12/1990 | European Pat. Off. . |
| 0 460 936 A1 | 12/1991 | European Pat. Off. . |
| 0 475 064 A1 | 3/1992 | European Pat. Off. . |
| 0 497 530 A2 | 8/1992 | European Pat. Off. . |
| 0 533 160 A1 | 3/1993 | European Pat. Off. . |
| 0 535 230 A1 | 4/1993 | European Pat. Off. . |
| 0 538 033 A1 | 4/1993 | European Pat. Off. . |
| 0 540 075 A1 | 5/1993 | European Pat. Off. . |
| 0 420 271 B1 | 12/1994 | European Pat. Off. . |
| 0 517 868 B1 | 11/1995 | European Pat. Off. . |
| 0 688 794 A1 | 12/1995 | European Pat. Off. . |
| 0 750 319 A1 | 12/1996 | European Pat. Off. . |
| 980788 | 4/1998 | Finland . |
| 63-279503 | 11/1988 | Japan . |
| 353509 | 12/1992 | Japan . |
| 942369 | 11/1963 | United Kingdom . |
| 2 028 831 | 3/1980 | United Kingdom . |
| WO 91/09075 | 6/1991 | WIPO . |
| WO 92/12182 | 7/1992 | WIPO . |
| WO 92/13029 | 8/1992 | WIPO . |
| WO 95/10548 | 4/1995 | WIPO . |
| WO 97/03124 | 1/1997 | WIPO . |

OTHER PUBLICATIONS

JP 2–235740 abstract. Jujo Paper Co Ltd, Sep. 18, 1990, abstract, figure 1. Japan, vol. 14, No. 552, M–1056.

JP 06340036 A abstract. Goyo PaperWorking Co Ltd, Dec. 13, 1994. Japan, vol. 94, No. 12.

JP 01100803 A2 abstract. STN International, File CAPLUS, CAPLUS accession No. 1989:555983, Doc. No. 111:155983, Hitachi Cable, Ltd.: "Hindered amine–containing crosslinked polyethylene electric insulators for cables and wires": Apr. 19, 1989.

JP 56065667 A abstract. Jun. 3, 1981.

WPI, Derwent Accession No. 90–326069, Jujo Paper MFG KK: "Blank for paper container for food packaging—comprises paper board, thermopolastic layer laminated for outside of container and two resin layers contain deodorise;" & JP A 2235740, 900918. +.

Saikkonin, Mikka. "Extrusion of slotted core elements," *Wire Technology International,* Nov. 1995.

Williams et al., Polymer Letters, vol. 6, pp. 621–624 (1968).

International Search Report for PCT/SE94/00773 dated Mar. 14, 1995.

International Search Report for PCT/SE94/01028 dated Mar. 14, 1995.

International Search Report for PCT/SE96/00900 dated Oct. 14, 1996.

(List continued on next page.)

*Primary Examiner*—Mark Kopec
*Attorney, Agent, or Firm*—Merchant & Gould P.C.

[57] ABSTRACT

A composition for electric cables is described. The composition comprises an ethylene copolymer which includes a (poly)alkylene glycol mono(meth)acrylate of formula (I) wherein $R_1$=H or $CH_3$; $R_2$=H or $CH_3$; n=1–20. The composition may be used as an insulating layer or a semiconducting layer of an electric cable.

16 Claims, No Drawings

OTHER PUBLICATIONS

International Search Report for PCT/SE97/01197 dated Oct. 28, 1997.

International Search Report for PCT/SE98/00013 dated May 5, 1998.

International Search Report for PCT/SE98/01786 dated Feb. 2, 1999.

International Search Report for PCT/SE98/01894 dated Feb. 2, 1999.

International Search Report (revised) for PCT/SE98/01894 dated May 4, 1999.

International Search Report for PCT/SE98/01949 dated Feb. 24, 1999.

International–Type Search Report for search request No. SE98/00591 dated Jan. 29, 1999.

File WPI, Derwent accession No. 77–85827Y, Sumitomo Chem Co Ltd: "Straight chain ethylene copolymers prepn.—by copolymerising ethylene, polyalkylene glycol mono–acrylate and ethylenically unsaturated monomer," JP, A, 52126495, 441024, DW7748.

COMPOSITION FOR ELECTRIC CABLES

This application is a continuation of international application number PCT/SE98/00013, filed Jan. 9, 1998, pending.

The present invention relates to a composition for electric cables. More specifically, the invention relates to a (meth)acrylate-ester-containing ethylene polymer which is usable in compositions for electric cables, more particularly in compositions for inner and outer semiconducting layers as well as insulating layers for electric cables.

Electric cables and particularly electric power cables for medium and high voltages are composed of a plurality of polymer layers extruded round the electric conductor. The electric conductor is usually coated first with an inner semiconductor layer followed by an insulating layer, then an outer semiconductor layer followed by water barrier layers, if any, and on the outside a sheath layer.

The insulating layer and the semiconductor layers normally consist of cross-linked ethylene homo- and/or copolymers. LDPE (low density polyethylene, i.e. polyethylene prepared by radical polymerisation at a high pressure) cross-linked by adding peroxide, for instance dicumyl peroxide, in connection with the extrusion of the cable, is today the predominant cable insulating material. A limitation of conventional LDPE is its tendency to be exposed, in the presence of water and under the action of strong electric fields, to the formation of dendritically branched defects, so-called water trees, which can lead to breakdown and possible electric failure. This tendency is strongly affected by the presence of inhomogeneities, microcavities and impurities in the material. Water treeing has been studied carefully, especially since the 1970's, when polymer materials and, in particular, cross-linked polyethylene became the predominant insulating material for electric cables for medium and high voltages. In the past years, these studies have entailed improvements in the construction of the cables, the manufacturing procedure and the quality and cleanliness of the used materials. These improvements have resulted in an increased service life of the manufactured cables. Yet there is a pronounced need of still more improved materials in respect of resistance and water treeing. Such an improved resistance to water treeing is desirable not only for insulating layer materials, but also for semiconductor layer materials of electric cables. Another important property of semiconductor layer materials of electric cables is high resistance to form cracks.

From European Patent Specification EP-A-0 057 604 it is known to inhibit water treeing by adding to a semiconducting composition, which mainly consists of a polyolefin and 5–50% by weight carbon black based on the weight of the total composition, a polyethylene glycol having a molecular weight of about 1000–20000 in an amount of 0.1–20% by weight. This composition is intended for semiconducting layers of electric cables and by adding polyethylene glycol, it is said to be possible to eliminate water trees which grow into the insulating layer from the interface between the insulating layer and the semiconducting layer.

Moreover, U.S. Patent Specification U.S. Pat. No. 4,812,505 discloses a composition, which is usable as insulating layer in electric cables and which is resistant to water treeing. The composition comprises a copolymer of ethylene and at least one alpha-olefin having 4–8 carbon atoms, such as 1-butene, 1-hexane or 1-octene, and besides comprises a polyethylene glycol having a molecular weight in the range of about 1000–20000 in an amount of 0.1–20% by weight.

The drawback of using water-tree-inhibiting additives, such as polyethylene glycol, is that there is a risk, owing to the insufficient compatibility of the polyethylene glycol with the base polymer (polyethylene), of sweating out the polyethylene glycol, especially if its molecular weight is not high. On the other hand, if the molecular weight is high, the possibility of efficient mixing is affected negatively.

European Patent Specification EP-A-0 538 033 discloses an extrudable ethylene hydroxy acrylate co- or terpolymer, which, in addition to ethylene, comprises 7–30% by weight hydroxy acrylate, and 0–40% by weight of a third monomer selected among vinyl esters, allyl esters, and acrylic or methacrylic esters which do not contain hydroxyl groups. The hydroxy acrylate may consist of any ester of glycol or polyglycol and acrylic acid or methacrylic acid, but preferably is hydroxyethyl methacrylate, hydroxymethyl methacrylate, hydroxypropyl acrylate or hydroxypropyl methacrylate. According to the patent specification, hydroxy acrylate is previously known in connection with hot melts, and the extruded product according to the patent specification, e.g. a film, is hydrophilic and absorbs and transmits moisture, the ethylene hydroxy acrylate copolymer improving the adhesion to, for instance, polar plastics and other materials and improves the strength properties because of the hydrogen bonds. The patent specification does not indicate the use of the polymer in compositions for electric cables.

From Derwent's Abstract No. 77-85827Y/48 of Japanese Patent Application JP 7644050, an ethylene copolymer is known, which comprises 25–99.9% by weight ethylene, 75–0.1% by weight polyalkylene glycol monoacrylate, and 0–65% by weight of other ethylenically unsaturated monomers. This polymer is said to be usable for paints, inks etc, as coating agents for metal, paper, wool etc, as adhesives etc. The use of the polymer in compositions for electric cables is not disclosed.

According to the present invention, it has now surprisingly been found that the use of (poly)alkylene glycol mono(meth)acrylate as comonomer in ethylene polymers renders it possible to provide compositions for electric cables having improved resistance to water treeing.

According to the invention, a composition for electric cables thus is provided, characterised in it comprises an ethylene copolymer which includes as a comonomer a (poly)alkylene glycol mono(meth)acrylate having the formula I (I)

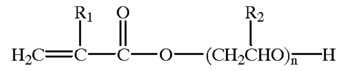

wherein $R_1$=H or $CH_3$, $R_2$ H or $CH_3$, n=1–20.

More particularly, it is contemplated to use the composition according to the invention in insulating and semi-conducting layers for electric cables.

Other distinguishing features and advantages of the invention will appear from the following specification and the appended claims.

By the expression "ethylene copolymer" here used is meant an ethylene-based polymer, which is obtained by polymerisation of ethylene and one or more other monomers, one of these other monomers consisting of (poly)alkylene glycol mono(meth)acrylate having the formula I. Preferably, the ethylene copolymer consists of a polymer of ethylene and the monomer of formula I, or of ethylene, the monomer of formula I and a further monomer, i.e. in the latter case a so-called terpolymer.

By the expressions "(meth)acrylic acid" and "(meth) acrylate" here used are meant acrylic acid and acrylate as well as methacrylic acid and methacrylate.

As appears from formula I above, the (poly)alkylene glycol mono(meth)acrylate of formula I is an ester of acrylic or methacrylic acid with a (poly)alkylene glycol, the alkylene glycol being selected among ethylene glycol or propylene glycol, and the number of alkylene oxide units being variable from 1 to 20, i.e. n=1–20, preferably 1–10 in formula l. Preferably $R_1$ in formula I is $CH_3$, i.e. the esterifying acid is methacrylic acid, and $R_2$ in formula I is H, i.e. the esterifying (poly)alkylene glycol is a (poly) ethylene glycol. When n=1 the monomer of formula I is hydroxyethyl methacrylate (HEMA) with the stated, preferred meanings of $R_1$ and $R_2$. When n=6 the monomer of formula I is hexaethylene glycol methacrylate with the stated, preferred meanings of $R_1$ and $R_2$.

The amount of the comonomer of formula I in the ethylene copolymer may vary within wide limits, but preferably constitutes about 0.1–15% by weight, more preferred about 2–14% by weight of the copolymer.

As stated above, the ethylene copolymer may optionally comprise further comonomers in addition to the comonomer of formula I, and it is preferred that the comonomer contains such a further monomer, i.e. that the copolymer is a terpolymer. This further comonomer can be selected among monomers, which are copolymerisable with ethylene and (poly)alkylene glycol mono(meth)acrylate of formula I. Such monomers are well known to those skilled in the art and no extensive enumeration will be required, but as examples, mention can be made of vinylically unsaturated monomers, such as $C_3$–$C_8$ alpha olefins, for instance propene, butene etc.; vinylically unsaturated monomers containing functional groups, such as hydroxyl groups, alkoxy groups, carbonyl groups, carboxyl groups and ester groups. Such monomers may consist of, for instance, (meth)acrylic acid and alkyl esters thereof, such as methyl-, ethyl- and butyl(meth)acrylate; vinylically unsaturated, hydrolysable silane monomers, such as vinyl trimethoxysilane; vinyl acetate etc.

The amount of further comonomer(s) in addition to (poly) alkylene glycol mono(meth)acrylate of formula I is from 0 to about 40% by weight, preferably about 1–30% by weight of the ethylene copolymer.

Regarding the above-mentioned monomers, the sum of all the monomer contents is 100% by weight.

The inventive ethylene copolymer can be prepared by graft copolymerisation or by free-radical-initiated high-pressure polymerisation.

Graft copolymerisation is a per se well-known polymerisation process in the art and therefore, no detailed description will be needed. In general terms, graft copolymerisation is carried out by copolymerisation of a vinylically unsaturated monomer with an ethylene polymer, such as an ethylene homopolymer or an ethylene copolymer, under the influence of a free radical initiator, such as a peroxide, for instance dicumyl peroxide (DCP). The temperature in the graft copolymerisation should be sufficient for decomposition of the free radical initiator with formation of free radicals, which, by using dicumyl peroxide as initiator, means about 150–200° C., and the polymerisation can be practically effected, for instance, by mixing the components in an extruder.

Free-radical-initiated high-pressure polymerisation, which is also well known in the art, is generally carried out by reacting, in a reactor, such as an autoclave or tube reactor, at a high pressure of about 100–300 MPa and an elevated temperature of about 80–300° C., the monomers under the influence of a radical initiator, such as a peroxide, hydroperoxide, oxygen or azo compound. When the reaction is completed, the temperature and the pressure are lowered, and the resultant unsaturated polymer is recovered. For further details regarding the production of ethylene polymers by high-pressure polymerisation during free-radical-initiation, reference can be made to Encyclopedia of Polymer Science and Engineering, Volume 6 (1986), pp 383–410, especially pp 404–407.

As mentioned above, it has been found according to the present invention that use of (poly)alkylene glycol mono (meth)acrylate of formula I in an ethylene copolymer results in enhanced water tree resistance (WTR), and therefore such an ethylene copolymer is usable as material for electric cables, for instance as insulating layer material or as semiconductor layer material. By (poly)alkylene glycol mono (meth)acrylate of formula I, which produces water tree resistance, being polymerised into the polymer, it is fixedly anchored in the polymer molecule and cannot migrate or be sweated out, as is the case with conventional WTR additives. This is a special advantage of the inventive polymers. In addition to the advantageous water tree resistance, it has been found that the inventive ethylene copolymer also leads to other favourable and desirable properties when using it as material in electric cables. Thus, it has been found that the ethylene copolymer according to the invention permits an improved dielectric strength, which is of value both to the insulating layer and the semiconducting layers of an electric cable. Further, the inventive ethylene copolymer has a good environmental stress cracking resistance (ESCR), which is of value for semiconducting layers of electric cables.

To further facilitate the understanding of the invention, some elucidative, but not restrictive Examples and comparative Examples will be given below.

EXAMPLE 1

The water tree resistance (WTR) was determined for three polymer compositions, Polymer 1, Polymer 2 and Polymer 3, by so-called AshcraEt testing.

Ashcraft testing, which is a testing method for determining the WTR properties of polymers, has been described by Ashcraft, A. C., "Water Treeing in Polymeric Dielectrics", World Electrotechnical Congress in Moscow, USSR, Jun. 22, 1977. By Ashcraft testing, well characterised effects are provided, viz. sharp, water-filled indentations, by means of a needle in compression-moulded cups. A voltage of 5 kV/6 kHZ is applied across the water, whereas the bottom of the cup is connected to earth. The temperature is constantly kept at 65° C. The average length of the water trees after 72 h ageing is considered as a measure of the growth rate of the water trees in the specific insulating material.

For the testing, compression-moulded test pieces were prepared from the various polymers, of which Polymer 1 consisted of a low-density polyethylene (LDPE) having a melt flow rate (MFR) of 2 g/10 min, which was used as reference, Polymer 2 consisted of 99.1 parts by weight of the same type of LDPE, to which 0.56 parts by weight of polyethylene glycol (PEG) having a molecular weight of about 20000 had been added as a conventional agent inhibiting water treeing, and Polymer 3, which was a composition according to the invention, consisted of 79.8 parts by weight of the same type of LDPE, to which had been added 20.0 parts by weight of a terpolymer of ethylene, methylacrylate (13% by weight), and hexaethylene glycol monomethacrylate (3% by weight) of formula I, wherein $R_1$=$CH_3$, $R_2$=H, and n=6. The polymer compositions also contained about 2 parts by weight of dicumyl peroxide as well as a stabiliser (about 0.2 parts by weight). The results from the Ashcraft testing are compiled in the Table below.

| | Water tree | |
|---|---|---|
| Composition | Average length (μm) | Average length (%) |
| Polymer 1 (reference) | 374 | 100 |
| Polymer 2 (comparative) | 149 | 40 |
| Polymer 3 (inventive) | 126 | 34 |

The test results clearly show the enhanced WTR properties of the composition according to the invention.

EXAMPLE 2

In this Example, the water tree resistance of two compositions according to the invention was compared by Ashcraft testing. The compositions consisted of low-density polyethylene (LDPE) having an MER=2 g/10 min in combination with different contents of a water-tree-inhibiting polymer, which consisted of a terpolymer of ethylene, 20% by weight vinyl acetate, and 9% by weight hydroxyethyl methacrylate (HEMA which is a comonomer of formula I, wherein $R_1$=$CH_3$, $R_2$=H and n=1). One composition contained 6.5% by weight of the water-tree-inhibiting polymer, whereas the other composition contained 14% by weight thereof. By Ashcraft testing, an average length of the water trees, counted in % of the average length of the water trees for the reference polymer in Example 1, of 46% for the composition having 6.5% by weight EVA-HEMA and 21% for the composition having 14% by weight EVA-HEMA. Thus, it is evident that the water tree resistance increases with an increasing content of the water-tree-inhibiting polymer containing the monomer of formula I.

EXAMPLE 3

In this Example, the dielectric strength of three semiconducting polymer compositions was measured, viz. polymer A, B and C, which constituted the inner semiconductor of an electric cable.

The first composition (Polymer A) consisted of an ethylene vinyl acetate copolymer (EVA) having 18% by weight vinylacetate, the composition containing about 40% by weight carbon black in order to make the composition semiconducting. This composition was used as reference.

The second composition (Polymer B) consisted of the same EVA polymer as in the first composition, with the difference that 0.6% by weight polyethylene glycol (PEG) having a molecular weight of about 20000 had been added. Besides, the composition contained about 40% by weight carbon black. This composition was an example of prior art.

The third composition (Polymer C) consisted of a terpolymer of ethylene, 18% by weight vinyl acetate and 3% by weight of a monomer of formula I. The monomer of formula I consisted of hexaethylene glycol monomethacrylate, i.e. $R_1$=$CH_3$, $R_2$=H and n=6 in formula I. Moreover, the composition contained about 40% by weight carbon black. This composition was a composition according to the invention.

Each of the three compositions above was incorporated as inner semiconducting layers in electric cables, which, seen from inside and outwards, consisted of a 1.4 mm copper conductor, an inner semiconducting layer having an outer diameter of 2.8 mm, an insulating layer having an outer diameter of 5.8 mm and an outer semiconducting ducting layer having an outer diameter of 6.1 mm. The insulating layer consisted of low-density polyethylene having an MFR of 2 g/10 min, and the outer semiconducting layer consisted of an ethylene butyl acrylate copolymer with an addition of about 40% by weight carbon black.

The testing of the dielectric strength was carried out on these test cables in accordance with a method developed by Alcatel AG & Co, Hannover, Germany, and described in an article by Land H. G., Schädlich Hans, "Model Cable Test for Evaluating the Ageing Behaviour under Water Influence of Compounds for Medium Voltage Cables", Conference Proceedings of Jlcable 91, 24–28 June 1991, Versaille, France. As a value of the dielectric strength is stated 63% of $E_{max}$ from Weibull diagram in kV/mm. The dielectric strength was measured on the one hand A) after ageing for 16 h at 90° C. in air and, on the other hand, B) after ageing for 1000 h at 9 kV/mm in 85/70° C. water. The results of the testing are stated in the Table below.

| | Dielectric Strength | |
|---|---|---|
| Composition | A (kV/mm) | B (kV/mm) |
| Polymer A (reference) | 77.9 | 39.6 |
| Polymer B (prior art) | 95.6 | 40.6 |
| Polymer C (inventive) | 93.6 | 45.4 |

As appears from the test results, the composition according to the invention showed good properties as inner semiconducting layers and, in particular, had an excellent electric dielectric strength after ageing for 1000 h at 9 kV/mm in 85/70° C. water.

EXAMPLE 4

In this Example, the dielectric strength was tested in a similar fashion as in Example 3 on an electric cable, which had as inner semiconducting layer a composition consisting of a terpolymer of ethylene, about 15% by weight methylacrylate and about 2% by weight hexaethylene glycol monomethacrylate, i.e. the same monomer of formula I as in Example 3, and about 40% by weight carbon black. In the testing, a dielectric strength (63% of $E_{max}$) of 59.4 kV/mm was obtained after ageing for 1000 h at 9 kV/mm in 85/70° C. water.

EXAMPLE 5

In this Example, the environmental stress cracking resistance (ESCR) was tested, a property that is important, particularly to the outer semiconducting layer of an electric cable. The testing was carried out according to ASTM D 1693, on the one hand with 10% Igepal at 50° C. and, on the other hand, in air at 50° C.

Three semiconducting polymer compositions (Polymer 1, 2 och 3) were tested, and their compositions were as follows.

Polymer 1 (comparative composition): ethylene vinyl acetate copolymer having 9% by weight vinyl acetate and an MFR=9.5 dg/10 min. Moreover, the composition contained about 36% by weight carbon black.

Polymer 2 (comparative composition): ethylene vinyl acetate copolymer having 18% by weight vinyl acetate and an MFR=9 dg/10 min. Moreover, the composition contained about 40% by weight carbon black.

Polymer 3 (according to the invention): ethylene vinyl acetate hydroxyethyl methacrylate terpolymer having 9% by weight vinyl acetate, 10% by weight hydroxyethyl methacrylate and an MFR=6 dg/10 min. Moreover, the composition contained about 36% by weight carbon black.

The result of the testing of ESCR is shown in the Table below and is stated as the number of test pieces of a total of 10 test pieces that were broken in the testing after a certain time, measured in hours.

| | Number of broken test pieces/number of hours | |
|---|---|---|
| Composition | ESCR, air 50° C. | ESCR, 10% Igepal |
| Polymer 1 | 10/0 | 9/0 |
| Polymer 2 | 3/4 | 9/1.5 |
| Polymer 3 | 1/6 | 7/24 |

As appears from the test results, the composition according to the invention had a considerably improved ESCR and is consequently well suited as material for outer semiconducting layers of electric cables.

What is claimed is:

1. A composition for electric cables, the composition comprising an ethylene copolymer which includes as a comonomer a (poly)alkylene glycol mono(meth)acrylate having the formula I (I)

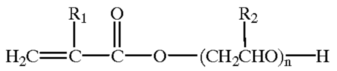

wherein $R_1$=H or $CH_3$, n=1–20 and wherein the composition forms a semi-conducting layer of an electric cable and further comprises carbon black in an amount sufficient to make the composition semi-conducting.

2. The composition as claimed in claim 1, wherein $R_1=CH_3$, $R_2$=H, and n=1–10.

3. The composition as claimed in claim 1, wherein n=1.

4. The composition as claimed in claim 1, wherein n=6.

5. The composition as claimed in claim 1, wherein the (poly)alkylene glycol mono(meth)acrylate of formula I constitutes 0.1–15% by weight of the ethylene copolymer.

6. The composition as claimed in claim 1, wherein the ethylene copolymer comprises, in addition to the (poly) alkylene glycol mono(meth)acrylate of formula I, a further vinylically unsaturated comonomer.

7. The composition as claimed in claim 6, wherein the further vinylically unsaturated comonomer is selected from $C_3$–$C_8$ alpha olefins, (meth)acrylic acid and esters thereof, vinyl acetate, and vinylically unsaturated, hydrolysable silane monomers.

8. The composition as claimed in claim 6, wherein the further vinylically unsaturated comonomer constitutes 1–40% by weight of the ethylene copolymer.

9. A composition for electric cables, the composition comprising an ethylene copolymer which includes as a comonomer a (poly)alkylene glycol mono(meth)acrylate having the formula I (I)

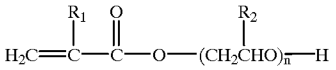

wherein $R_1$=H or $CH_3$, n=1–20 and wherein the composition forms an insulating layer of an electric cable.

10. The composition as claimed in claim 9, wherein $R_1=CH_3$, $R_2$=H, and n=1–10.

11. The composition as claimed in claim 9, wherein n=1.

12. The composition as claimed in claim 9, wherein n=6.

13. The composition as claimed in claim 9, wherein the (poly)alkylene glycol mono(meth)acrylate of formula I constitutes 0.1–15% by weight of the ethylene copolymer.

14. The composition as claimed in claim 9, wherein the ethylene copolymer comprises, in addition to the (poly) alkylene glycol mono(meth)acrylate of formula I, a further vinylically unsaturated comonomer.

15. The composition as claimed in claim 14, wherein the further vinylically unsaturated comonomer is selected from $C_3$–$C_8$ alpha olefins, (meth)acrylic acid and esters thereof, vinyl acetate, and vinylically unsaturated, hydrolysable silane monomers.

16. The composition as claimed in claim 9, wherein the further vinylically unsaturated comonomer constitutes 1–40% by weight of the ethylene copolymer.

* * * * *